(12) United States Patent
Warr et al.

(10) Patent No.: US 10,575,123 B1
(45) Date of Patent: Feb. 25, 2020

(54) CONTEXTUAL NOTIFICATIONS FOR A NETWORK-BASED SERVICE

(71) Applicant: Uber Technologies, Inc., San Francisco, CA (US)

(72) Inventors: Andrew Martin Warr, San Francisco, CA (US); Gioconda De Almeida, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/276,303

(22) Filed: Feb. 14, 2019

(51) Int. Cl.
  *H04W 4/21* (2018.01)
  *H04W 4/021* (2018.01)

(52) U.S. Cl.
  CPC .................. *H04W 4/021* (2013.01)

(58) Field of Classification Search
  CPC .............. H04W 4/021; G06Q 30/0261; G06Q 30/0269; G06Q 50/01; G06Q 10/1093
  USPC .......... 455/456.1, 456.3, 404.2, 457
  See application file for complete search history.

(56) References Cited

U.S. PATENT DOCUMENTS

| | | | |
|---|---|---|---|
| 7,945,585 B1 | 5/2011 | Sorkin | |
| 9,172,738 B1 | 10/2015 | daCosta | |
| 2010/0057548 A1 | 3/2010 | Edwards | |
| 2013/0007665 A1 | 1/2013 | Chaudhri | |
| 2013/0132140 A1 | 5/2013 | Amin | |
| 2013/0226897 A1* | 8/2013 | Carver .................. G06F 16/951 707/709 |
| 2013/0246164 A1 | 9/2013 | Khanna | |
| 2013/0246301 A1 | 9/2013 | Radhakrishnan | |
| 2013/0325922 A1 | 12/2013 | Chaudhri | |
| 2014/0026088 A1 | 1/2014 | Monte | |
| 2014/0143738 A1 | 5/2014 | Underwood | |
| 2014/0181197 A1 | 6/2014 | Baggott | |
| 2015/0012341 A1 | 1/2015 | Amin | |
| 2015/0081391 A1 | 3/2015 | Brereton | |
| 2016/0069694 A1 | 3/2016 | Tao | |
| 2016/0140789 A1 | 5/2016 | Wickersham, III | |
| 2017/0046736 A1 | 2/2017 | Elmachtoub | |
| 2017/0075536 A1* | 3/2017 | Cho ........................ G06F 16/248 |

(Continued)

FOREIGN PATENT DOCUMENTS

CN   106777396   5/2017

OTHER PUBLICATIONS

ISR and Written Opinion in PCT/US2018/048453 dated Nov. 7, 2018.

(Continued)

*Primary Examiner* — CongVan Tran
(74) *Attorney, Agent, or Firm* — Mahamedi IP Law LLP

(57) ABSTRACT

A network system can transmit notification data to a user device to cause the user device to present a contextual notification that can remind the user to interact with the network-based service. The notification data can be selectively transmitted and the notification can be selectively presented based on a determined likelihood of the user submitting a service request within a given time period. A metric representative of such a likelihood can be determined for the user based on historical data associated with the network-based service. The metric can be compared against one or more threshold values. In response to a user interaction with the notification, the user device can present a request user interface for a streamlined and simplified user experience in submitting a service request.

20 Claims, 5 Drawing Sheets

(56) References Cited

U.S. PATENT DOCUMENTS

| | | |
|---|---|---|
| 2017/0200195 A1 | 7/2017 | Kugler |
| 2017/0220240 A1* | 8/2017 | Kataria |
| 2018/0232464 A1* | 8/2018 | Looney ................. G06T 19/003 |
| 2018/0315088 A1* | 11/2018 | Bijor .................. G06Q 30/0261 |
| 2019/0066161 A1 | 2/2019 | Peng |

OTHER PUBLICATIONS

Yang Z., et al., Study on Inventory Control for Rental Cars Based on Customer Choice Behavior, Journal of East China Jiaotong University, Feb. 28, 2016, vol. 33, No. 1, pp. 1-8—Only Abstract Available.
McLaren, Sharing Cities, MIT Press, 2015, pp. 21-69.
Edelman, Computing the Mind, Oxford University Press, 2008, pp. xi-36.
Wirth, Algorithms + Data Structures = Programs, 1976, pp. xii-55.
Lakoff, Metaphors We Live By, University of Chicago Press, 1980, pp. ix-55.
Goffman, Frame Analysis, Northeastern University Press, 1974, pp. 1-39, 301-344.
Gupta, Inside Bluetooth Low Energy, Artech House, 2013, pp. 119-130.
IPRP in PCT/US2018/048453 dated Aug. 22, 2019.

\* cited by examiner

CONTEXTUAL NOTIFICATIONS FOR A NETWORK-BASED SERVICE

BACKGROUND

A user of a conventional network service can submit requests for one or more items provided by an entity to be delivered by a service provider to a service location. The user can do so via an application executing on a device of the user.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
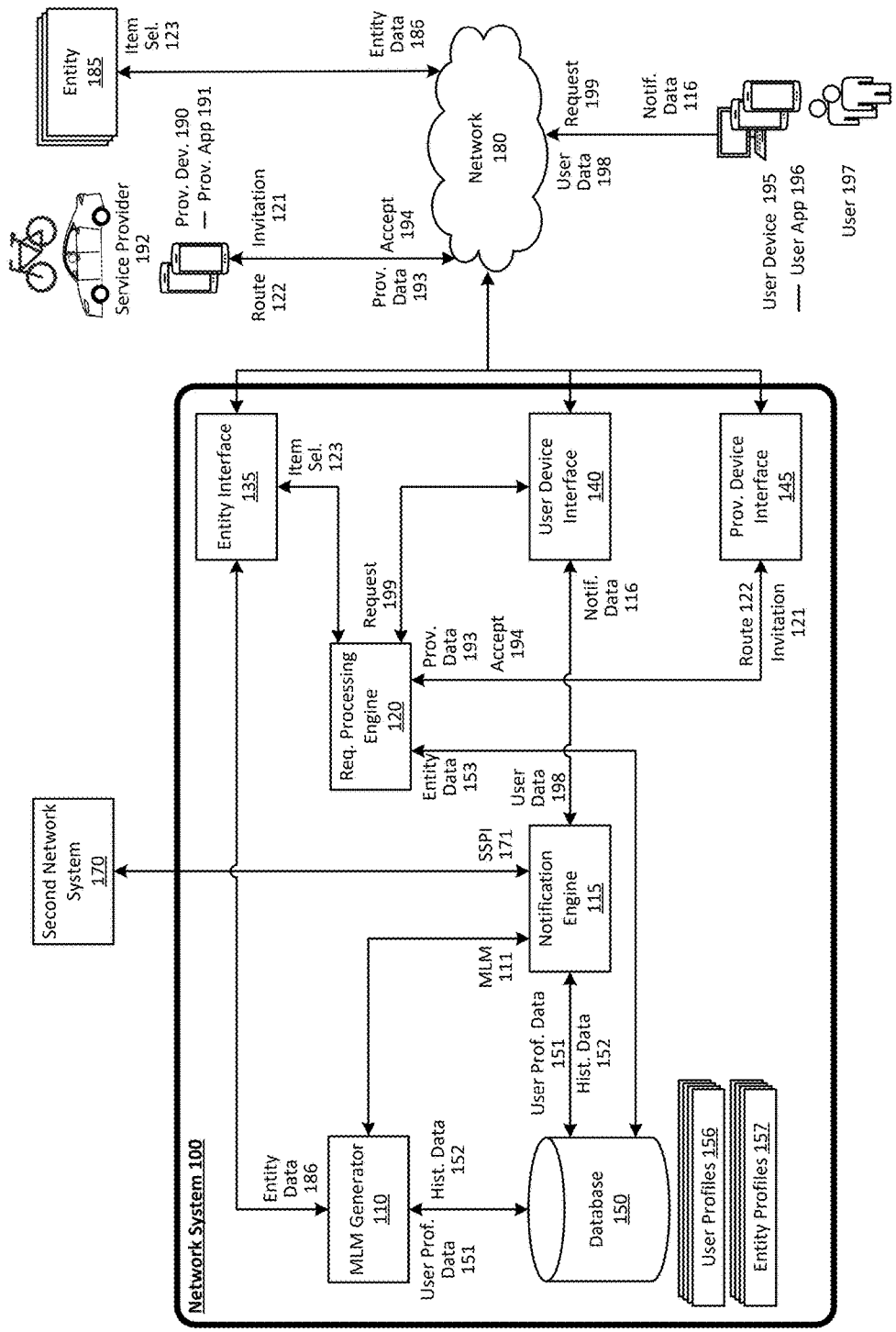
FIG. 1 is a block diagram illustrating an example network system in communication with provider devices and user devices, in accordance with examples described herein, in accordance with examples described herein.

A network service, which is implemented by one or more servers or network computer systems (referred to herein as a "network system" for purposes of simplicity), is provided herein that links service providers (e.g., drivers, couriers, autonomous vehicles (AVs), etc.) with requesting users throughout a given geographic region (e.g., a metroplex such as the San Francisco Bay Area). In doing so, the network service communicates with a pool of service providers over the given geographic region, each operating a vehicle for providing services and one or more computing devices ("service provider devices" or "provider devices"). In various implementations, the network system receives requests for services (e.g., a transport service, a delivery service, etc.) from requesting users via a designated user or client application ("user application") executing on the users' mobile computing devices ("user devices"). In response, the network system identifies one or more available service providers to fulfill each user's request. According to embodiments, the network system and/or the user device can determine whether to present a notification relating to the network-based service for a given user based on a determined metric that is representative of a likelihood the given user will submit a service request (or interact with the user application for the network-based service) within a given time window (e.g., within the next 30 minutes, within the next hour, etc.). Thus, the network system and/or the user device can selectively cause a notification for the network-based service to be presented on the user device based on a determined likelihood of whether the user will interact with the user application and/or a determined likelihood of whether the user will submit a service request within a given time period. The network system can be configured to determine the metric for the given user and compare the metric against one or more threshold values.

In various examples, user devices and provider devices can be computing devices such as smartphones, wearable devices, tablets, laptop computers, desktop computers, etc. The network service enables users to select, via the user application executing on the user device, one or more items provided by one or more entities. As referred to herein, an entity can correspond to an individual, a company, a group, a vendor or merchant, etc., that provides one or more goods or items for sale (e.g., a chef, a baker, a restaurant, a café, a store, etc.). A service request received by the network system can include a requesting user's selection of one or more items provided by an entity(s) to be transported by the service provider to a service location for delivery to the requesting user. In such a context (e.g., food ordering and delivery service), the service location can be a delivery location at which the service provider is to rendezvous with and/or deliver the requested items to the requesting user. In response to the service request, the network system can notify the entity(s) of the user's selection. In addition, the network system can identify an available service provider to fulfill the user's request. The network system can transmit an invitation to a provider device of the identified service provider, who can accept the invitation to fulfill the requested service.

Although network-based services such as those described above offer convenience for users in comparison with non-computerized counterparts, many shortcomings exist in conventional network-based services. For instance, to request services in a conventional delivery service via a user application executing on the user device, the user typically has to launch the user application on the user device, go through a myriad of menus and options to select items of interest, and subsequently submit a request for service. The problem is exacerbated in mobile computing devices, such as smartphones, where screens for displaying content relating to the network-based service is limited. As a result of limited screen real estate, the user may be forced to go through even more menus or must scroll through even more content to submit service requests. In addition, conventional methods of engaging users for conventional network-based services (e.g., by transmitting notifications to user devices) are inefficient. Notifications are transmitted regardless of whether user behavior is likely to be affected by viewing the notifications and, as a result, such transmissions waste both network transmission bandwidth and processing power on the user device in presenting the notifications. In addition, the user device's display or user interface can become cluttered with unwanted notifications—a problem that is again exacerbated by the limited amount of display real estate available on mobile computing devices.

According to embodiments, the network system can generate and transmit notification data to cause a notification to be presented on a user device of a user of the network-based service. The notification can be a push notification (e.g., a notification that is received by the user device and displayed in one or more ways) or an in-application notification ("in-app notification"). The notification can be actionable by the user (e.g., via a tap gesture or a swipe gesture on a touch screen of the user device). The user can interact with the notification to cause the user application for the network-based service to launch and/or perform a set of actions relating to the network-based service. For instance, in response to the user's interactions with the actionable notification, the user application can launch and automatically submit a request for service. In some examples, in response to user interaction with the notification, the user application can be launched and can present a user interface (e.g., a service request interface for submitting service requests of the network-based service) that is pre-populated with a set of content to allow for an expedited or streamlined user experience in submitting the service request. The actionable notification can further suggest or remind the user to request for services.

The network system can maintain user profiles for each of the users of the network-based service and each of the user profiles can include data indicating details of past instances of the network-based service for the corresponding user. A given user profile for a given user can include information such as the given user's preferred/frequently used addresses (e.g., work address, home address, etc.), historical data for past instances of the network-based service requested by and/or rendered for the given user, the given user's implicit (e.g., derived based on historical data) and/or explicit (e.g., stated, inputted into the user application, etc.) preferences with respect to items for selection and/or entities. In some implementations, the network system can further maintain one or more databases storing collective information regarding a plurality of users of the network-based service. For example, anonymized information (e.g., implicit or explicit preferences with respect to items for selection, entities, service times, etc.) regarding a group of users located in within a geographic area can be In various aspects, the notification can be displayed based on information associated with the user (e.g., user history with the network-based service, user preferences, user's location, user's etc.) and various other parameters (e.g., current time and/or day of week, availability of nearby entities, historical data of other users with respect to the network service, etc.). The network system and/or the user device (e.g., via the user application executing on the user device) can determine whether to present notifications for a given user, when to present a notification for the given user, the contents of the notification, and/or the actions to be performed by the user device in response to a user interaction with the notification.

In one example, the network system can determine not to transmit notification data to the user device of the user in response to determining that the metric is above a threshold value (e.g., indicating that the user is more likely to submit a request) and can determine to transmit notification data in response to determining that the metric value is below the threshold value (e.g., indicating that the user is less likely to submit a request). In this manner, a notification can be caused to be displayed on the user device only if the network system determines that the user is not likely to launch the user application and/or not likely to submit a service request within a given time window. In effect, a first user who is determined to not be likely to submit a service request (e.g., as compared to a threshold value) can be presented with a targeted notification reminding the user to interact with the user application for the network-based service to submit a service request; whereas a second user who is determined to already be likely to submit a service request will not be presented with such a notification.

In other examples, the network system can compare the determined metric for the given user with two or more threshold values. In one such example, the network system can determine to transmit notification data to the user device based on or in response to determining that a likelihood of the user submitting a service request within a given time period (or a likelihood of the user launching or interacting with the user application for the network-based service) is between two threshold values (e.g., a low threshold value and a high threshold value). In this manner, notifications can be intelligently presented to users for whom the notifications are most relevant. Users who are determined to be likely to interact with the user application to submit service requests even without being promoted by notifications will not be presented with notifications and their devices need not receive notification data from the network system. Similarly, users who are determined to be unlikely to interact with the user application to submit even when prompted by notifications on their user devices (e.g., metric below a threshold value) will also not be presented with notifications. For each of these categories of users, notifications with respect to the network-based service may be perceived as unnecessary or spam.

According to embodiments, the network system can determine or compute the metric for a given user based on data relating to the given user (e.g., service history, user preferences, etc.), data relating to other users of the network-based service, and various contextual information (e.g., current time/day of the week, availability of nearby entities, service progress information of a second network-based service, etc.). For instance, the network system can determine, based on past service history for the user, the user typically launches and/or views the application, and/or submits service requests at a certain time or during a certain period of time (e.g., noon to 12:30 PM on weekdays, 1:00 to 2:00 PM on weekends, etc.). Based on such information, the network system can determine a metric indicating a likelihood of the user submitting a request during certain time windows. The time windows can be predetermined. For instance, for a food delivery service, time windows can be predetermined to be around meal times (e.g., for breakfast, lunch, or dinner). Thus, based on the service history data of the given user, the network system can determine a metric for the given user indicating that the user is likely to submit service requests during a predetermined time window of 12:00 PM to 1:00 PM on a Monday.

In various implementations, the network system can further determine the metric for a given user based on the service history data associated with a population of users of the network-based service in a given area. For instance, the network system can determine the times of the day users in the given area typically requests the network-based service. Based at least in part on this information, the network system can determine the metric for the given user. As an illustrative example, the network system can maintain user profile data for a population of users within a metropolitan area that collectively indicate that users within the metropolitan area typically submit service requests (e.g., requests for delivery of food items) between 12:30 PM and 1:30 PM on weekdays. The network system can analyze the profiles of the users within the metropolitan area to determine a metric for a given user at 12:00 PM on a Monday and determine whether to transmit notification data to the given user's user device at that time based at least in part on the determined metric. In this manner, the network system can proactively and intelligently transmit notification data to a given user device based on past behaviors of a population of users so that a notification regarding the network-based service can be displayed for the given user at a relevant time.

In certain implementations, the network system can determine the metric for a given user based on historical data associated with more granular geographic sub-regions than an entire metropolitan area in which the network-based service is offered (or based on historical data of a more granular subset of users). A geographic sub-region and/or a subset of users having consistent patterns of past behavior with respect to the network-based service can be determined. For example, a geographic sub-region in which users typically submit service requests within a certain time window (e.g., a downtown financial district in which users typically submit service requests for deliveries of food items between 12:00 PM and 1:00 PM during weekdays, a residential neighborhood in which users typically submit service requests for deliveries of food items between 6:00 PM and 8:00 PM every day of the week, etc.). In this manner, whether a contextual notification is presented on a given user device can be determined based on past behavior of other users in the same area as the given user's location (or the service location) and thus most likely to exhibit the same preferences and behaviors as the given user. The network system can analyze user profile data to identify consistent user behaviors across the service region to determine demarcations of various geographic areas used in the determination of whether to transmit notification data to user devices. In some examples, the geographic sub-regions (or the subset of users) can be predefined or selected by a system administrator.

In certain examples, the network system can also determine the metric based on contextual information concerning a second network-based service (e.g., a transport service). In some examples, metric determination can be based on the service parameters or service progress information of the second network-based service. For instance, the metric determination can be based on the service location (e.g., drop-off location of the transport service), service time (e.g., drop-off time), estimated time of arrival at the service location, and the like. In one such example, the network system can receive the user's service progress information with respect to a transport service (e.g., from a second network system managing the transport service, from the user device) and determine the metric based at least in part on service progress information. In one example, the network system can determine that the service location of the transport service is the user's residence and the estimated time of arrival is around 6:00 PM. Based on this information and the past user history indicating that the user submits requests for food delivery service 70% of the time under these or similar circumstances, the network system can compute a metric for the user. The computed metric can be determined to be higher (e.g., indicating a higher probability of the user submitting a service request within, for example, the subsequent hour) than another scenario where the user utilizes the transport service to the gym at 2:00 PM on a Sunday.

In some examples, the network system can also determine a time at which the notification is to be displayed on the screen of the user device (or a time at which to transmit notification data to the user device). The network system can determine an expected delivery time for the given user. This can be determined based on past delivery times at which requests are typically delivered for the given user based on the historical data associated with the given user. This can also be determined based on the historical data associated with other users (e.g., users requesting delivery in the same geographic sub-region or within a predetermined distance of the user's location). The network system can determine the time at which to display the notification based at least in part on the estimated delivery time. In this determination, the network system can further take into account preparation times (e.g., time it takes for the entity to prepare requested items, etc.), transit times (e.g., wait time for a service provider, travel time for the service provider from the entity location to the service location, etc.) and the time it typically takes the given user to submit a request. The estimation of these parameters can be based on historical data and can be determined based on one or more machine-learned models. These parameters can also be determined individually for each user of the network-based service. For example, if the given user typically requests a first set of items from a first entity, the network system can estimate the preparation times and transit times based on the historical data associated with the first entity in preparing the first set of items as well as the historical data associated with service provider performance in traveling from the first entity to a location at or near the service location requested by the given user. In this manner, the network system can transmit notification data in time and cause a notification to be displayed on the user device in time such that the requested items can be delivered to the user at or before the expected delivery time.

In various implementations, one or more aspects of the request interface that is presented in response to user interaction with an actionable notification can be automated or for an expedited or streamlined user experience. The notification data transmitted from the network system can include a set of default parameters to be associated with the service request. For example, the service request interface can be automatically populated with a set of default items to be requested by the user for delivery. The service request interface can also be automatically populated with a default service location at which a service provider fulfilling the service request is to rendezvous with the user and/or deliver the requested items to the user. As a result, the user can interact with a simple input (e.g., a single tap) within the service request interface to submit a service request using the default set of parameters. The service request interface can further include an option for the user to modify the parameters of the service request (e.g., add, remove, or replace items to be ordered, modify the service location, modify a service time, etc.) prior to submitting the service request to the network system.

Among other benefits, embodiments described herein allow for contextual notifications that are presented on a user device based on a determined likelihood that the user will interact with the network-based service (e.g., submit a service request). In this manner, notification data may not be transmitted by the network system if it is determined that the user is already likely to submit a service request without any notifications or that the user is unlikely to submit a service request even if presented with a notification. In this manner, network resources of the network system and the user device as well as processing resources of the user device can be rendered more efficient. In addition, this prevents the limited display real estate of the user device to be cluttered with unwanted or unnecessary notifications. Furthermore, the contextual notification can be interactive for the user to cause a request user interface to be presented that is aimed at streamlining the user experience in submitting service requests (e.g., by pre-selecting items for the user). This enables the user application to better utilize the limited display real estate of the user device and enables the user to avoid scrolling through numerous menus to submit a service request.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network system.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Descriptions

FIG. 1 is a block diagram illustrating an example network system in communication with provider devices and user devices, in accordance with examples described herein. Network system 100 can implement or manage a network-based service (e.g., an on-demand delivery service, etc.) that connects requesting users 197 with service providers 192 that are available to fulfill the users' service requests 199.

The network system 100 can provide a platform that enables on-demand services to be provided by an available service provider 192 for a requesting user 197 by way of a user application 196 executing on the user devices 195, and a provider application 191 executing on the provider devices 190. As used herein, provider device 190 and user device 195 can be computing devices configured to execute respective designated applications (e.g., provider application 191, user application 196, etc.) for the on-demand service managed by the network system 100. In many examples, the provider device 190 and the user device 195 can comprise mobile computing devices, such as smartphones, tablet computers, VR or AR headsets, on-board computing systems of vehicles, smart watches, and the like.

In one example, a requesting user 197 can submit a request 199 over the network 180 that indicates one or more selected items for delivery by one or more service providers 192 to a service location that can also be indicated by the request 199. The network system 100, in response to receiving the request 199, can process the request 199 and transmit a request 128 to a relevant entity(s) 185 to provision or prepare the one or more items requested by the requesting user 197

According to embodiments, the network system 100 can include a request processing engine 120 for processing the received request 199. The request processing engine 120 can communicate the items selected by the requesting user 197 and transmit an item selection message 123 to the relevant entity 185 (e.g., a restaurant that provides the items selected by the user 197) to enable the entity to begin preparing the selected items. The request processing engine 120 can look up relevant information relating to the entity (e.g., by querying for the entity data 153 from a database 150 storing entity profile data 157) in order to properly transmit the item selection message 123 to computers, terminals, or devices (e.g., a transaction terminal, a point-of-sale terminal, a mobile computing device operated by the entity, etc.).

The request processing engine 120 can further identify a service provider from a plurality of service providers 192 to service the request 199. The service provider can be identified based on its current location relative to the entity(s) selected in the request 199. For instance, the network system 100 can maintain communications with each of the service provider devices 190 to monitor the current locations of the service providers 192. In response to the request 199, the request processing engine 120 can identify a service provider based on its current location being within a predetermined distance (or travel time) from the entity(s) associated with the request 199. In some cases, the request processing engine 120 can identify a service provider 192 based on its provider class. For instance, if the entity(s) and/or the service location are located in a dense urban region, the request processing engine 120 can identify a service provider having a provider class corresponding to service providers operating motorcycles or bicycles rather than automobiles. In addition, the identification of service providers can be based on request group 127 received from request processing engine 120. The request group 127 can indicate a group of service requests to be serviced by a single service provider. The request processing engine 120 can utilize this information to identify service providers to fulfill service requests 199.

Upon identifying a service provider to fulfill the request 199, the request processing engine 120 can generate an invitation 122. The invitation can be transmitted by the provider device interface 145 to the provider's provider device 190 via the network(s) 160. In response, the identified service provider can accept or decline the invitation 122. If the service provider accepts the invitation 122 (e.g., via a selection within the provider application 191), the network system 100 can transmit to the provider device 190, for example, a route 121 determined by the request processing engine 120 to facilitate the fulfillment of the request 199 by the provider device. If the service provider declines the invitation 122, the request processing engine 120 can identify another suitable service provider.

In the examples described herein, the request processing engine 120 can also determine a route 121. The route 121 can be transmitted to the selected service provider to follow in fulfilling the requested service. The route 121 can include a route segment(s) to the entity(s) and a route segment(s) to the service location(s). In one example, the route can include at least first route segment from the current location of the service provider 192 to the entity(s) 185 providing the one or more selected items and a second route segment from the entity(s) to the service location such that the one or more selected items can be tendered to the requesting user 197. In another example, if the service provider is identified by the network system 100 to fulfill service requests 199 requesting items from more than entity, the route 121 can include a first route segment from the current location of the selected service provider to a first one of the entities, a second route segment from the first one of the entities to a second one entities, etc. Furthermore, if the service provider 192 is identified by the network system 100 to fulfill multiple service requests having different service locations, the route 121 can include a segment from the last one of the entities to the first one of the service locations, a segment from the first one of the service locations to a second one of the service locations, etc.

In various implementations, the network system can comprise a database 150 for storing information such as user profiles 156 and entity profiles 157. A user profile 156 can store information such as a corresponding user's preferences in items offered by entities (e.g., item preference, favorite entities, favorite item genre, disliked items, food allergies, etc.). The user profile 156 can also store the user's most frequently used or favorite service locations (e.g., work, home, etc.). In addition, the user profile 156 can store information regarding the user's past service requests submitted to the network system 100 (e.g., items requested, amount spent, etc.). The data stored in the database 150 can be continually updated as additional or more up-to-date information is collected by the network system 100. Using information stored in the user profiles 156, the network system 100 can optimize the corresponding users' 197 experiences. For instance, the network system 100 can generate item or entity suggestions or recommendations based on information stored in the user profiles 156. Furthermore, as described herein, the network system 100 can utilize the historical data and information stored in the user profiles 156 to generate contextual notifications for display on user devices 197.

According to embodiments, the network system 100 can include a notification engine 115 that can generate notification data 116 for transmission to the user device 195. The notification data 116 can be transmitted to the user device 195 via the user device interface 140 and over the network 180. The user device 195 can present a contextual notification for the user 197 based on the notification data 116 received from the network system 100. The notification engine 115 can determine whether to cause a notification to be presented on the user device 195 (e.g., whether to transmit notification data 116 to the user device 195) by computing a metric for the user 197 of the user device 195. The metric can be indicative of a likelihood the user will submit a service request or interact with the user application within a given time period. The notification engine 115 can compare the metric against one or more threshold values in determining whether to transmit notification data 116 to the user device 195.

The metric for the given user 197 can be computed based on user profile data 151 (e.g., information or data regarding or determined from past instances of the network-based service of the user 197). The profile data 151 can be retrieved or queried from a corresponding user profile for the user 197 maintained in the database 150 by the network system 100. The profile data 151 can indicate, for example, the past behavior of user 197 in interacting with the network-based service (e.g., submitting service requests). Information contained in the profile data 151, such the days and times at which the user 197 typically submits service requests, can be utilized in determining the metric.

The metric for the user 197 can be computed based further on historical data 152 (e.g., information or data regarding or determined from past instances of the network-based service for other users of the network-based service). In some implementations, the notification engine 115 can determine a subset of users of the network-based service whose historical data is to be included in historical data 152 and thus used in computing the metric for the user 197. A subset of users having consistent patterns of past behavior with respect to the network-based service can be determined and. For example, a geographic sub-region in which users typically submit service requests within a certain time window (e.g., a downtown financial district in which users typically submit service requests for deliveries of food items between 12:00 PM and 1:00 PM during weekdays, a residential neighborhood in which users typically submit service requests for deliveries of food items between 6:00 PM and 8:00 PM every day of the week, etc.). In this manner, whether a contextual notification is presented for the user 197 can be determined based on past behavior of other users in the same area as the user 197's location (or the service location) and thus most likely to exhibit the same preferences and behaviors as the user 197.

Depending on the implementation, the notification engine 115 can determine respective weights to be attributed to the user profile data 151 of the user 197 and to the historical data 152 of other users of the network-based service in determining the metric for the user 197. In one instance, such as when the user 197 does not have sufficient data in his or her user profile, the metric for the user 197 can be based entirely on the historical data 152. In other examples, the weights can be varied based on the time, day, or location of the user 197. For example, the determination of the metric for the user 197 while she or he is in a home region (e.g., city of residence and work) can be based in part on the user profile data 151 of the user 197 and in part on the historical data 152. But when the user 197 travels to a different region in which the user 197 has no service history with respect to the network-based service, the notification engine 115 can determine the metric for the user 197 based entirely on the historical data 152 associated with other users in the region to which the user 197 is traveling. Alternatively, the notification engine 115 can assign additional weight to the historical data 152 (as compared to when the user 197 is in his or her home region) in determining the metric. Thus, the user 197 can be reminded to interact with the network-based service or to submit service requests based on the typical behavior of users in the destination region of the user 197. In some implementations, separate metrics can be computed using the user profile data 151 and the historical data 152, appropriate weights can be assigned to the separate metrics, and the metric for the user 197 can be determined by combining the separate metrics.

According to embodiments, the network system 100 can communicate with a second network system 170 that manages a second network-based service (e.g., a transport service). The notification engine 115 can receive second service progress information (SSPI) 171 that indicates the parameters or progress information of the second network-based service for the user 197 in determining whether to cause a notification to be displayed on the user device 195 (e.g., in determining the metric for the user 197). The SSPI 171 can indicate, for example, a destination location and estimated time of arrival of a trip arranged by the transport service for the user 197. The notification engine 115 can determine the metric for the user 197 based on the destination location. For example, the notification engine 115 can determine the metric for the user 197 to be higher in a first scenario where the user 197 is arriving home at 6:00 PM using the transport service as compared with a second scenario where the user 197 is traveling to the gym at 2:00 PM in the afternoon. In the first instance, the user 197 is more likely to submit a service request for a delivery service based on the information included in the SSPI 171.

In certain examples, based on the SSPI 171 (e.g., ETA and destination location), the network system 100 can generate and transmit notification data 116 to the user device 195 to cause the user device 195 to present a notification on the user device 195 while the user 197 is en-route to the destination location so that the user 197 can submit the service request 199 prior to arriving at the destination location. In this manner, the item can be delivered to the user 197 at approximately the same time the user 197 is to arrive at the destination location. In some implementations, the notification data 116 transmitted to the user device 195 can cause a notification to be presented within a second user application other than user application 196 (e.g., an in-app notification or content card within a second dedicated user application for interacting with the second network-based service).

Depending on the particular implementation, the SSPI 171 can also be received over the network 180 from the user device 195. For instance, a second user application associated with the second network-based service can transmit SSPI 171 to the network system 100 (e.g., the second user application can be "linked" to the user 197's profile for the network-based service by way of entering the user 197's logon credentials for the network-based service within the second user application).

Depending on variations, the metric for the user 197 can be determined using one or more machine-learned models 111. The machine-learned models 111 can be generated by a machine-learning model generator ("MLM generator") 110. The machine-learned models 111 can be trained by the MLM generator 110 based on the user profile data 151 of the user 197 and the historical data 152 of other users of the network-based service. The machine-learned models 111 can also be trained using data relating to the second network-based service. In certain implementations, the one or more machine-learned models 111 used to determine the metric for user 197 can include a user-specific machine-learned model generated based on user profile data 151 of the user 197 and a second machine-learned model derived from historical data 152 of other users of the network-based service. For another user of the network-based service, the notification engine 115 can determine that user's metric based on another machine-learned model generated by the MLM generator 110 using that user's profile data and the second machine-learned model derived from historical data 152 (also used for user 197). In other implementations, one machine-learned model 111 can be used and can include data derived from both the user profile data 151 as well as historical data 152. The machine-learned models 111 can be a decision tree-based model (e.g., a random forest model) and can be generated by the MLM generator 110 based on data collected with respect to the network-based service (e.g., user profile data 151 and historical data 152).

The metric for the user 197 can also be determined based on user data 198 received via the one or more networks 180 from the user device 195. The user data 198 can include information such as the current location of the user 197. The current location can be determined by the user device 195 and can be generated by one or more geo-aware resources such as GPS, GLONASS, Galileo, or BeiDou receivers. Based on the current location of the user 197, the notification engine 115 can determine the relevant data (e.g., historical data 152) and machine-learned models 111 to utilize in determining the metric for the user 197.

In some examples, in response to receiving the notification data 116, the user device 195 can immediately present or display a contextual notification for the user 197. In other examples, the notification data 116 can indicate a time at which the notification should be presented on the user device 195. In response to receiving such a set of notification data 116, the user device 195 can schedule the notification to be displayed or presented at the indicated time. Thus, the network system 100 can determine ahead of time whether to cause a notification to be presented on the user device 195 and transmitted notification data 116 to cause the user device 195 to present the notification at the time indicated in the notification data.

In various examples, the notification presented on the user device 195 can be actionable by the user to cause a request user interface for submitting a service request (e.g., request 199) to be presented on the user device 195 (e.g., within the user application 196). In response to a user interaction with the notification (e.g., a tap gesture, a swipe gesture, etc.), the user device 195 can present the request user interface. The request user interface can be automatically populated with content or information to help streamline the user experience. For instance, the "cart" of the request user interface can be automatically populated with one or more items (e.g., dishes, food items, drinks, etc.) such that the user 197 can submit service request 199 with a single tap of a request user interface feature. If the user 197 wishes to modify the automatically populated content (e.g., the pre-selected items), the user 197 can do so before submitting the request 199.

The notification data 116 generated by the notification engine 115 also includes content data corresponding to the content to be displayed by the user device 195 in presenting the contextual notification. The content data can include content to be displayed on the notification itself ("notification content") such as text and graphic information reminding the user to submit a service request. The notification content can inform the user 197 of relevant contextual information and can provide a summary for the user 197 to pique the user's interest in interacting with the contextual information presented on the user device 195. For example, the notification content can inform the user 197 that service requests for the network-based service for the area (e.g., for delivery in the area) in which the user 197 is currently located are typically requested for a particular time (e.g., delivery time of 12:00 PM) and can prompt the user at 11:00 AM to submit a request for delivery at the typical time at which service is requested by users in the area. As another example, the notification content can also include information regarding the second network-based service (e.g., derived from SSPI 171): the notification content can inform the user 197 that the user 197 is estimated to arrive at a destination location of the second network-based service (e.g., a transport service) at, for example, 6:00 PM and can prompt the user 197 to submit a service request for delivery at the destination location such that requested items can be delivered to the user 197 at or around the time the user 197 is estimated to arrive at the destination location.

The notification data 116 can further include content for display within the user application 196 ("application content") after the user 197 interacts with the contextual notification. Application content can include an identification of items to be pre-selected for the user 197 for a service request in the request user interface that is displayed after the user 197 interacts with the notification. The application content can be generated by the notification engine 115 based on the user profile data 151 that indicates the preferences and past service requests of the user 197. The application content can include the pre-selection of frequently requested items of the user 197 such that the user 197 can easily and quickly request those items for service. The application content can be dependent on the user 197's location (e.g., as indicated by user data 198). For example, the preselection of items for delivery can be dependent on where the user 197 is located (e.g., depending on which entities are nearby). The application content can also be dependent on the historical data 152 of other users of the network-based service. For instance, the application content can suggest items or entities that are popular with users of the network-based service in the area in which the user 197 is located. In some implementations, the application content is not transmitted as part of the notification data 116 and instead is queried by the user device 195 in response to the user 197 interacting with the contextual notification. Thus, the network system 100 transmits the application content to the user device 195 after the user 197 interacts with the contextual notification.

Methodology

Figure 2:
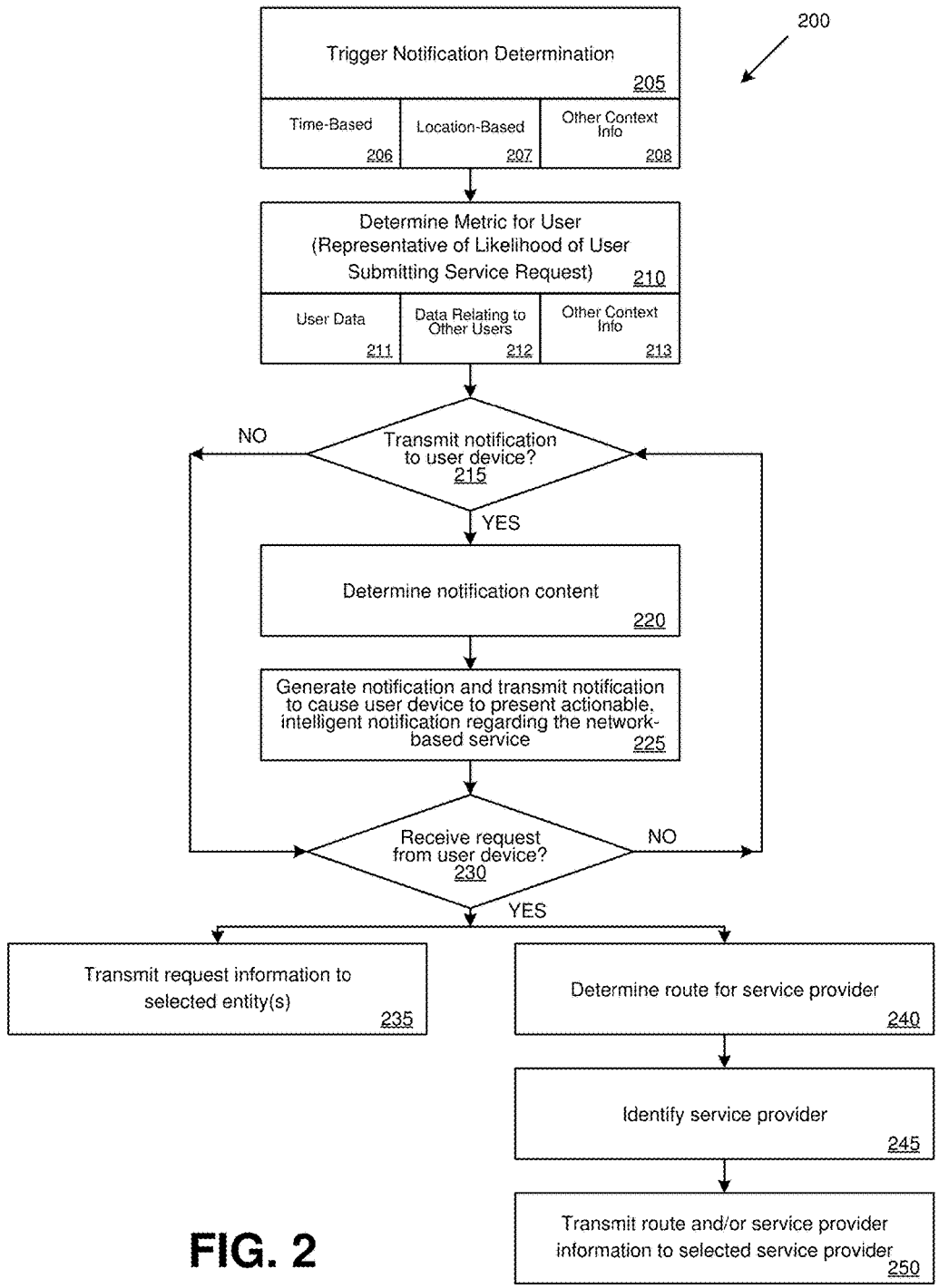
FIG. 2 is a flow chart describing an example method of generating contextual notifications for a given user device, according to examples described herein.

FIG. 2 is a flow chart describing an example method of generating contextual notifications for a given user device, according to examples described herein. In the below discussion of FIG. 2, reference may be made to features and examples shown and described with respect to FIG. 1. For instance, the method 210 shown in FIG. 2 may be performed by network system 100 and/or user device 195 illustrated in and described with respect to FIG. 1.

Turning to FIG. 2, in certain implementations, the network system and/or a user device can detect for one or more triggers to determine whether to cause a notification(s) to be presented for the user device (211). The notification determination can be time-based (206), location-based (207), or based on other contextual information (208). For example, the network system can be triggered to perform a determination in response to detecting that the user's location has changed (e.g., the user has moved to a different geographic region or geographic sub-region). The contextual information to trigger the determination can include service progress information relating to a second network-based service (e.g., a transport service) being requested or in progress for the user. In addition or as an alternative to detecting for triggering events to perform notification determination, the network system and/or the user device can periodically (e.g., once per day) determine whether to present contextual notifications to on the given user device.

The network system is configured to determine a metric for the given user that is representative of a likelihood the user will interact with the user application for the network-based service or submit a service request within a given time period (e.g., the next 2 hours, the next 12 hours, etc.) (210). As described herein, the metric can be determined based on: (i) data specific to the user (e.g., user's service history, user preferences stored in the user profile, etc.) (211), (ii) data relating to other users (e.g., usage patterns and preferences of other users in the same area as the user) (212), and/or (iii) contextual information (e.g., nearby events such as sporting events, weather conditions, user's service progress with a second network-based service such as a transport service, etc.). In utilizing data corresponding to other users of the network-based service, the network system can ensure that the data is anonymized. In addition, the network system can make the determination using one or more machine-learned models (e.g., random forest model, decision tree-based model, etc.) that are trained using the various categories of data described above. The network system can determine whether to transmit notification data to the user device of the user by comparing the determined metric against one or more threshold values (215).

If the network system determines to transmit notification data to the user device, the network system can then determine notification content (220). The notification content can include text or graphics to be displayed within the contextual notification. The notification data can be generated based on the user profile of the user and data corresponding to other users of the network-based service. For example, the notification content can inform the user that service requests for the network-based service for the area (e.g., for delivery in the area) in which the user is currently located are typically requested for a particular time (e.g., delivery time of 12:00 PM) and can prompt the user at 11:00 AM to submit a request for delivery at the typical time at which service is requested by users in the area. The network system can transmit the notification data to cause the user device to present a contextual notification on the user device (225). The user device can present a request user interface in response to user interactions with the contextual notification.

According to embodiments, the network system can wait to receive a request from the user device (230). The request can be submitted using the request user interface displayed in response to user interaction with the contextual notification or can be submitted by the user separately launching the user application without being prompted by a contextual notification. The request can include data regarding the user's selection of one or more items for service to a specified or predetermined service location. The request can be generated by the user device in response to the requesting user's interaction with the user application (e.g., using a "Submit" or "Place Order" or "Check Out" user interface feature). In various examples, in response to receiving the request at step 230, the network system transmits request information to the relevant entity(ies) (235). In some examples, the request information includes a desired preparation completion time. The desired preparation completion time can be a time for the entity to complete preparation of a corresponding item that is estimated by the network system to ensure that the request is fulfilled in a timely manner (e.g., at or around the desired service time). As an alternative, the network system can transmit information to enable the entity(ies) to prepare items based on historical data relating to demand.

According to embodiments, the network system further determines an optimal route for a service provider in fulfilling the request for service (240). This step may be performed, for example, by service request processing engine 120 of FIG. 1. In particular, the optimal routes can be determined based on preparation times associated with the one or more selected items to, for example, minimize wait times for the selected service provider as well as the requesting user. For example, based on the preparation times, the network system can determine the optimal route such that the selected service provider arrives at the location of an entity at or around the time that a selected item being prepared by the entity is estimated to be ready for pick-up. The network system can further optimize the route by determining a sequence of entities on the route based on the preparation times of the selected items. The network system can additionally optimize the route to reduce travel distance and/or time. In addition, the network system can receive real-time data from entities to update the optimal route. For example, based on real-time data indicating delays at one particular entity, the network system can update the optimal route to account for the delays (e.g., re-order the order of entities or delaying the route segment to the particular entity experiencing the delays). In this manner, the route for the service provider can remain optimal based on up-to-date information.

In various aspects, the network system can identify or select a service provider from a plurality of service providers to fulfill the request for service (245). For instance, the network system can select a service provider located proximately to an entity and/or the service location. Additionally, the network system can select a service provider based on the optimal route. For instance, the network system can select a bicycle service provider based on the optimal route being within a dense urban environment. In contrast, if the optimal route includes one or more segments over a freeway or highway, the network system can select an automobile service provider. In addition, the network system can identify a service provider based on a service capacity associated therewith. For instance, the network system can determine a required service capacity based on items selected by requesting users in a group of service requests to be serviced by a single service provider. The network system can identify a service provider such that the service capacity of the service provider is sufficient in fulfilling the group of service requests.

According to embodiments, the network system can transmit data corresponding to the optimal route to the selected service provider (250). The data corresponding to the optimal route can include content data, such as map data to enable or cause a provider device of the selected provider to display route guidance or an interactive map that includes the optimal route.

User Interface Examples

Figure 3B:
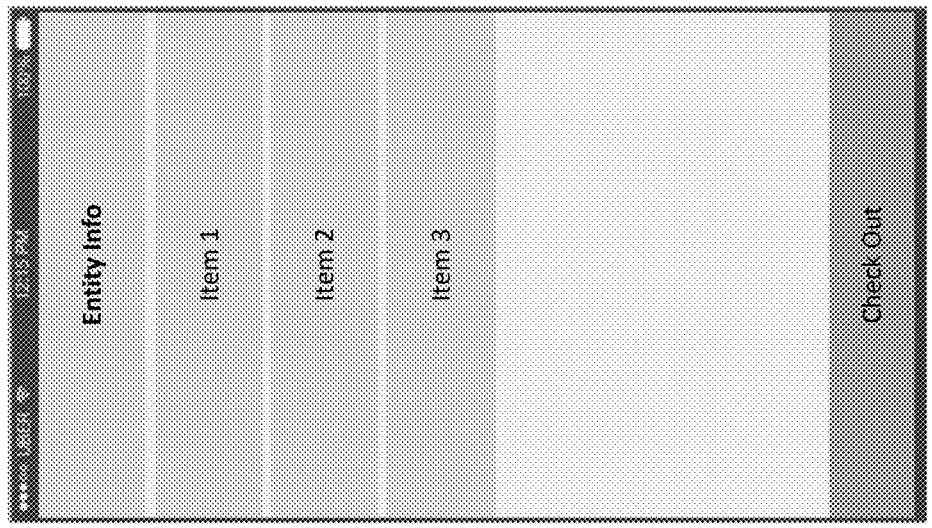
FIGS. 3A and 3B are figures illustrating examples of a contextual notification and a request user interface, respectively, in accordance with examples described herein.
Figure 3A:
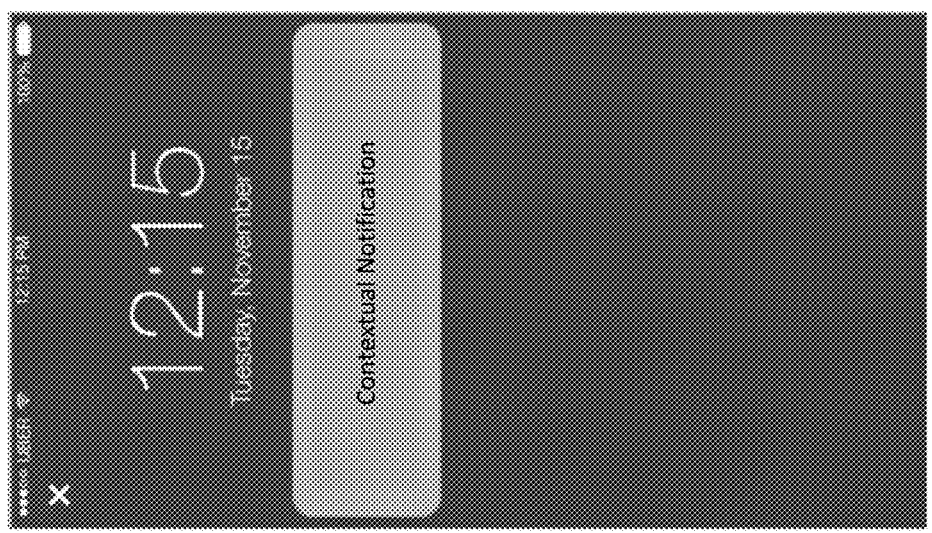

FIGS. 3A and 3B are figures illustrating examples of a contextual notification and a request user interface, respectively, in accordance with examples described herein.

Referring to FIG. 3A, the contextual notification can be displayed by a user device in response to notification data being received from the network system. The notification can be displayed at a time specified in the notification data (e.g., delayed presentation) or can be immediately presented by the user device in response to receiving the notification data. When the user device is locked or when the screen of the user device is off, the contextual notification can be displayed on a lock screen of the user device operating system. As described with respect to FIG. 1, the notification content can inform the user 197 of relevant contextual information and can provide a summary for the user.

Referring to FIG. 3B, the request user interface can be displayed in response to a user interaction with the contextual notification (e.g., a tap gesture, a swipe gesture, etc.). The contents of the request user interface can be customized for the particular user and can be generated based on the historical data of the user (e.g., stored in the user's user profile). In various aspects, the request user interface can be presented to allow for a streamlined and easy user experience in interacting with the network-based service and/or submitting a service request within the user application. For instance, the request user interface can include a pre-selection of items for the user (e.g., the user's favorite items or frequently requested items) in submitting a service request. The request user interface can clearly indicate the items that are pre-selected (e.g., added to the user's "cart"). In some cases, the request user interface can provide information relating to the entity (e.g., entity name, entity contact information, entity address, a user rating of the entity, etc.). Although not specifically illustrated in FIG. 3B, the request user interface can further include service information such as a predetermined service location (e.g., a location at which the user is to receive the delivery of items) which can be derived based on the user's current location and an estimated service time (e.g., a time at which a service provider is estimated to deliver the preselected items to the user). The user is able to easily and quickly modify any aspect of the unsubmitted request via the request user interface. For instance, the user is able to add, remove, or replace preselected items. The user is further able to modify the service location, specify a service time (e.g., ASAP or schedule a service time), and browse offerings by other entities in the nearby area. Once the user is satisfied with the parameters of the request, the user can submit the service request via a "Check Out" or "Order" user interface feature. The request submission process can be streamlined by utilizing payment information already on file with the network-based service (e.g., stored in the user's user profile).

Hardware Diagrams

Figure 4:
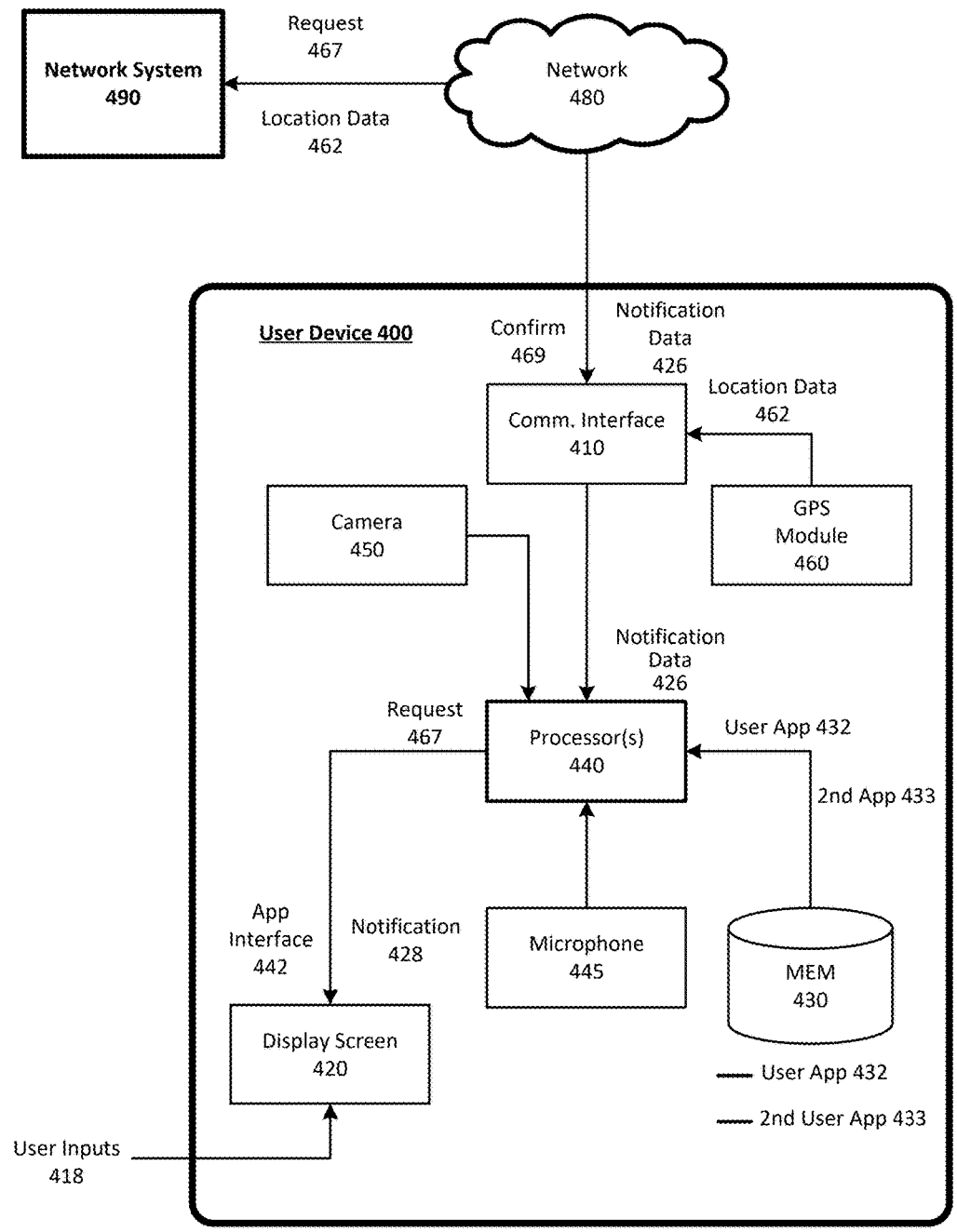
FIG. 4 is a block diagram illustrating an example mobile computing device, in accordance with examples described herein.

FIG. 4 is a block diagram illustrating an example mobile computing device, in accordance with examples described herein. In many implementations, the mobile computing device 400 can be a smartphone, tablet computer, laptop computer, VR or AR headset device, and the like. In the context of FIG. 1, the user device 195 and/or the provider device 190 may be implemented using a mobile computing device 400 as illustrated in and described with respect to FIG. 4.

According to embodiments, the mobile computing device 400 can include typical telephony features such as a microphone 445, a camera 450, and a communication interface 410 to communicate with external entities (e.g., network system 490 implementing the network-based service) using any number of wireless communication protocols. The mobile computing device 400 can store a designated application (e.g., a service application 432) in a local memory 430. The service application 432 can correspond to one or more user applications for implementations of the mobile computing device 400 as user devices for the network-based service. The service application 432 can also correspond to one or more provider applications for implementations of the mobile computing device 400 as provider devices for the network-based service.

In response to an input 418, the service application 432 can be executed by a processor 440, which can cause an application interface 442 to be generated on a display screen 420 of the mobile computing device 400. In implementations of the mobile computing device 400 as provider devices, the application interface 442 can enable a service provider to, for example, accept or reject invitations to fulfill service requests generated by network system 490. The invitations can be received as incoming service messages 469 and acceptances of the invitations can be transmitting by the mobile computing device 400 to the network system 490 as outgoing service messages 467. In implementations of the mobile computing device 400 as user devices, the application interface 442 can enable a user to, for example, request for the network-based service. The request for service can be transmitted to the network system 490 as an outgoing service message 467.

In various examples, the mobile computing device 400 can include a GPS module 460, which can provide location data 462 indicating the current location of the mobile computing device 400 to the network system 490 over a network 480. In some implementations, other location-aware or geolocation resources such as GLONASS, Galileo, or BeiDou can be used instead of or in addition to the GPS module 460. The network system 490 can utilize the current location 462 of the mobile computing device 400 to manage the network-based service (e.g., selecting service providers to fulfill service requests, routing service providers and users, determining service locations for users, etc.).

A second user application 433 can be stored in the memory 430 of the mobile computing device 400. The second user application 433 can correspond to a dedicated user application for a second network-based service (e.g., a transport service). In certain implementations, the second user application 433 can be configured to share information of the second network-based service (e.g., service progress information) with the user application 432 or with the network system 490. For instance, the login credentials for the user for the network-based service can be within the second user application 433 to allow the second user application 433 to transmit data to the network system 490. As another example, the network-based service and the second network-based service can utilize the same set of login credentials.

The communication interface 410 is configured to receive notification data 426 over the network 480. In response to receiving the notification data 426, the mobile computing device 400 can present a contextual notification 428 on the display screen 420. The notification can be presented immediately or can be displayed at a later time specified in the notification data 426. The user can interact with the contextual notification via user inputs 418 (e.g., a tap gesture, a swipe gesture). A specific user interface of the user application 432 (e.g., a request user interface) can be presented in response to receiving the user inputs 418 interacting with the contextual notification that enables the user to efficiently interact with the network-based service and the user application 432.

Figure 5:
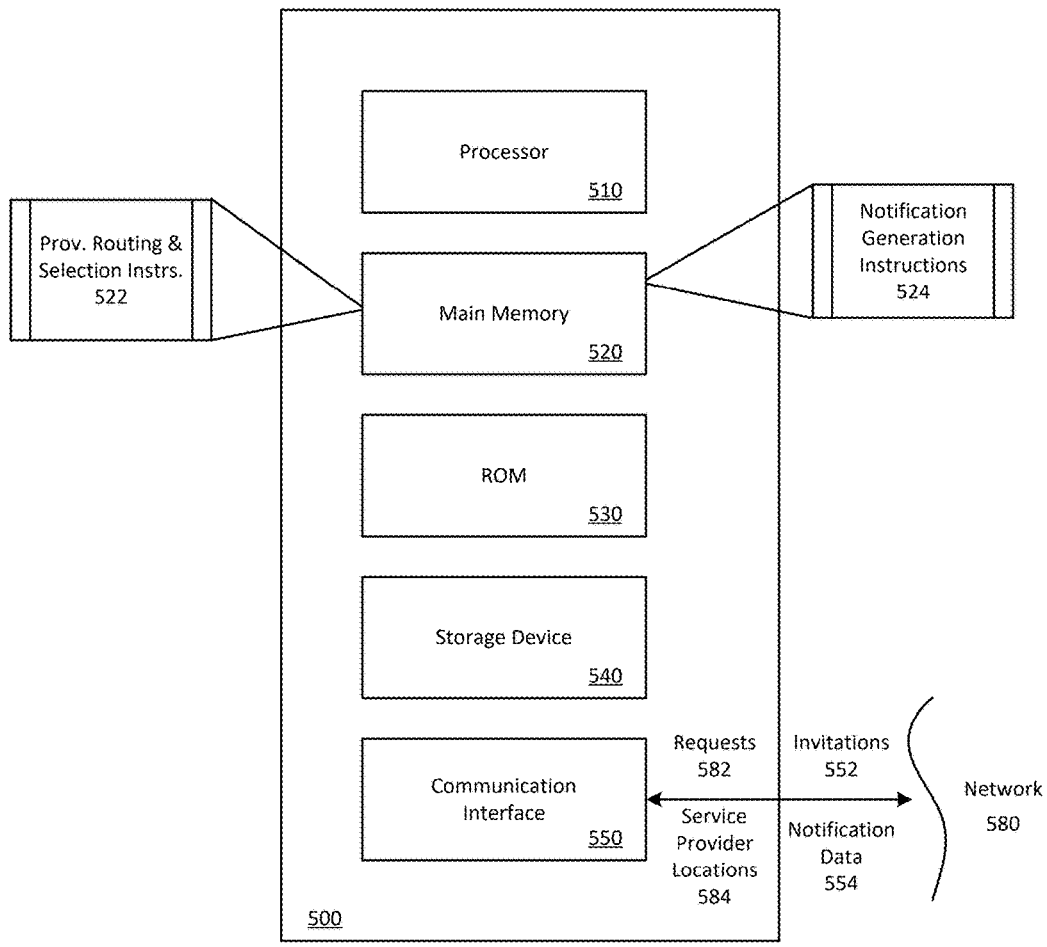
FIG. 5 is a block diagram that illustrates a computer system upon which examples described herein may be implemented.

FIG. 5 is a block diagram that illustrates a computer system upon which examples described herein may be implemented. A computer system 500 can represent, for example, hardware for a server or combination of servers that may be implemented as part of a network service for providing on-demand services. In the context of FIG. 1, the network system 100 may be implemented using a computer system 500 or combination of multiple computer systems 500 as described by FIG. 5.

In one aspect, the computer system 500 includes processing resources (processor 510), a main memory 520, a memory 530, a storage device 540, and a communication interface 550. The computer system 500 includes at least one processor 510 for processing information stored in the main memory 520, such as provided by a random access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the memory 530 or other static storage device for storing static information and instructions for the processor 510. A storage device 540, such as a magnetic disk or optical disk, is provided for storing information and instructions.

The communication interface 550 enables the computer system 500 to communicate with one or more networks 580 (e.g., a cellular network) through use of a network link (wireless or wired). Using the network link, the computer system 500 can communicate with one or more computing devices, one or more servers, and/or one or more self-driving vehicles. In accordance with some examples, the computer system 500 receives service requests from mobile computing devices of individual users. The executable instructions stored in the memory 530 can include service provider routing and selection instructions 522 and notification generation instructions 524 to perform one or more of the methods described herein when executed.

By way of example, the instructions and data stored in the memory 520 can be executed by the processor 510 to implement an example network system 100 of FIG. 1. In performing the operations, the processor 510 can handle service requests and provider statuses and submit service invitations to facilitate fulfilling the service requests. The processor 510 executes instructions for the software and/or other logic to perform one or more processes, steps and other functions described with implementations, such as described by FIGS. 1 through 3B.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

By performing the functions and techniques described herein, the computer system 500 is configured to receive requests 582 from user devices over the network 580 and identify appropriate service providers (e.g., based on service provider locations 584 received from provider devices over the network). The computer system can transmit invitations 552 to the identified service providers to invite the identified service providers to fulfill the requested service. In addition, the computer system 500 can generate notification data 554 to cause a user device to present a contextual notification that is specifically determined for the given user operating the user device.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network system comprising:
one or more processors; and
one or more memory resources storing instructions that, when executed by the one or more processors of the network system, cause the network system to:
maintain, in a database accessible to the network system, historical data for each of a plurality of users of a network-based service;
determine, for a first user of the plurality of users, a metric representative of a likelihood of the first user submitting a service request for the network-based service within a given time window based at least in part on historical data associated with the first user and historical data associated with a subset of the plurality of users; and
in response to determining that the metric is between a low threshold value and a high threshold value, transmit, over one or more networks, a set of notification data to a first user device of the first user to cause the first user device to present a notification regarding the network-based service, wherein the notification is actionable by the first user to cause the first user device to present a user interface for submitting a service request for the network-based service.

2. The network system of claim 1, wherein the set of notification data causes the first user device to present the user interface by automatically populating the user interface with a set of content in response to a user interaction with the notification.

3. The network system of claim 2, wherein the executed instructions further cause the network system to determine the set of content for the first user based on the historical data associated with the first user.

4. The network system of claim 2, wherein the executed instructions further cause the network system to determine the set of content for the first user based on historical data associated with the subset of the plurality of users.

5. The network system of claim 2, wherein the set of content includes one or more items to selected by the first user.

6. The network system of claim 1, wherein the executed instructions further cause the network system to:
communicate with the first user device to determine a location of the first user; and
identify, based on the location of the first user, two or more users for the subset of the plurality of users.

7. The network system of claim 1, wherein the executed instructions further cause the network system to determine the metric for the first user is based further on contextual information, including one or more of: (i) a current time or (ii) a location of the first user.

8. The network system of claim 1, wherein the executed instructions further cause the network system to determine of the metric for the first user is based further on service progress information associated with a second network-based service for the first user.

9. The network system of claim 8:
wherein the second network-based service is a transport service; and
wherein the determination of the metric for the first user is based on a service location and an estimated time of arrival associated with the transport service.

10. The network system of claim 1, wherein the executed instructions further cause the network system to:
generate, based on the historical data associated with each of the plurality of users of the network-based service, one or more machine-learned models; and
wherein the metric for the first user is determined based, at least in part, on the one or more machine-learned models.

11. The network system of claim 10, wherein the one or more machine-learned models includes a random forest model.

12. The network system of claim 1, wherein the executed instructions further cause the network system to:
receive, from the first user device, a service request for the network-based service, the service request indicating one or more items to be provided by an entity and a service location;
identify, based at least in part on a location of the entity and the service location, a service provider from a plurality of service providers; and
transmit, to a provider device of the identified service provider, an invitation to fulfill the service request.

13. The network system of claim 12, wherein the service request for the network-based service is generated by the first user device via a user interaction with the user interface.

14. The network system of claim 1, wherein the executed instructions further cause the network system to trigger the determination of the metric for the first user based on one or more of: (i) a current time or (ii) a location of the first user.

15. A computer-implemented method of generating and transmitting notification data for a first user, the method being performed by a network system and comprising:
maintaining, in a database accessible to the network system, historical data for each of a plurality of users of a network-based service;
determining, for a first user of the plurality of users, a metric representative of a likelihood of the first user submitting a service request for the network-based service within a given time window based at least in part on historical data associated with the first user and historical data associated with a subset of the plurality of users; and
in response to determining that the metric is between a low threshold value and a high threshold value, transmitting, over one or more networks, a set of notification data to a first user device of the first user to cause the first user device to present a notification regarding the network-based service, wherein the notification is actionable by the first user to cause the first user device to present a user interface for submitting a service request for the network-based service.

16. The computer-implemented method of claim 15, wherein causing the first user device to present the user interface comprises automatically populating the user interface with a set of content in response to a user interaction with the notification.

17. The computer-implemented method of claim 15, further comprising:
communicating with the first user device to determine a location of the first user; and
identifying, based on the location of the first user, two or more users for the subset of the plurality of users.

18. The computer-implemented method of claim 15, wherein the determination of the metric for the first user is based further on a service location and an estimated time of arrival associated with a transport service for the first user.

19. The computer-implemented method of claim 15, further comprising:
generating, based on the historical data associated with each of the plurality of users of the network-based service, one or more machine-learned models; and
wherein the metric for the first user is determined based, at least in part, on the one or more machine-learned models.

20. A non-transitory computer-readable medium storing instructions that, when executed by one or more processors of a network system, cause the network system to:
maintain, in a database accessible to the network system, historical data for each of a plurality of users of a network-based service;
determine, for a first user of the plurality of users, a metric representative of a likelihood of the first user submitting a service request for the network-based service within a given time window based at least in part on historical data associated with the first user and historical data associated with a subset of the plurality of users; and
in response to determining that the metric is between a low threshold value and a high threshold value, transmit, over one or more networks, a set of notification data to a first user device of the first user to cause the first user device to present a notification regarding the network-based service, wherein the notification is actionable by the first user to cause the first user device to present a user interface for submitting a service request for the network-based service.

* * * * *